United States Patent [19]
Cantwell

[11] Patent Number: 4,636,973
[45] Date of Patent: Jan. 13, 1987

[54] VERNIER ADDRESSING APPARATUS

[75] Inventor: Robert H. Cantwell, Sudbury, Mass.

[73] Assignee: Raytheon Company, Lexington, Mass.

[21] Appl. No.: 400,330

[22] Filed: Jul. 21, 1982

[51] Int. Cl.$^4$ .............................................. G06F 7/52
[52] U.S. Cl. .................................... 364/764; 364/900
[58] Field of Search ............... 364/764, 735, 736, 761, 364/749, 200 MS File, 900 MS File, 715, 748, 754, 757-760

[56] References Cited

U.S. PATENT DOCUMENTS

| | | | |
|---|---|---|---|
| 3,328,767 | 6/1967 | Ottaway | 364/200 |
| 3,610,905 | 10/1971 | Herron et al. | 364/749 |
| 3,648,038 | 3/1972 | Sierra | 364/765 |
| 3,735,110 | 5/1973 | LeComte | 364/729 |
| 3,809,868 | 5/1974 | Villalobos et al. | 364/518 |
| 3,917,935 | 11/1975 | Lazecki | 364/761 |
| 4,150,364 | 4/1979 | Baltzer | 364/900 |
| 4,276,607 | 6/1981 | Wong | 364/757 |
| 4,313,174 | 1/1982 | White | 364/757 |
| 4,357,674 | 11/1982 | Ikeda et al. | 364/754 |
| 4,374,427 | 2/1983 | Katayama | 364/761 |
| 4,470,125 | 9/1984 | Dischert et al. | 364/760 |

FOREIGN PATENT DOCUMENTS

| | | |
|---|---|---|
| 0012951 | 7/1980 | European Pat. Off. |
| 1411290 | 10/1975 | United Kingdom . |
| 1423698 | 2/1976 | United Kingdom . |
| 1468783 | 3/1977 | United Kingdom . |
| 2060961 | 5/1981 | United Kingdom . |

Primary Examiner—James D. Thomas
Assistant Examiner—Dale M. Shaw
Attorney, Agent, or Firm—Walter F. Dawson

[57] ABSTRACT

A vernier address scale reduces the number of addressable memory locations required for numerical look-up tables. Read-only memories (ROMs) store the data of linear or non-linear functions. Decoders determine which ROM is selected and advantage is taken of accuracy improvement as numbers become large by dropping least significant bits as the vernier address scale moves from one ROM table to another. Accuracy is further improved by using a method of one-half level quantization step for rounding. This reduces the size of numerical tables for math processing of reciprocals, roots of numbers, powers of numbers, logarithms, trigonometric and exponential functions.

30 Claims, 12 Drawing Figures

SIGNAL LEVEL Y
12/3 SCALING

VERNIER ADDRESSING APPARATUS

The Government has rights in this invention pursuant to Contract No. N00024-79-C-7130 awarded by the Department of the Navy.

BACKGROUND OF THE INVENTION

This invention relates to digital processing systems and more particularly to reducing the number of addressable memory locations and therefore the number of read-only memories (ROMs) required for numerical look-up table calculations while maintaining desired accuracy.

Memory look-up tables for performing arithmetic operations are well known in the state of the art. However, the number of memory locations or the number of read-only-memories (ROMs) required has often been a limiting function even though ROM capacity continually increases through technology advancement.

Various methods for reducing ROM capacity have been used. For example, elimination of the least significant bits reduces ROM storage requirements but results in a permanent loss of accuracy especially for small magnitudes. Another method is described in a patent of C. LeConte, U.S. Pat. No. 3,735,110 wherein a sine/cosine generator comprises a ROM which stores only the sine values of angles. A trigonometric identity is used to obtain cosine values thereby providing a reduction in the required amount of memory storage locations. In the patent of S. Lazecki, U.S. Pat. No. 3,917,935, the memory storage is reduced by first shifting input data bits, representative of the magnitude of numbers, to their more significant values whenever the magnitude of the largest of the two input numbers is less than that permitted by the maximum capacity of a system word, and using only some numbers of the shifted higher order data bits as the input address to a look-up table. This approach is applicable when calculating an arithmetic ratio of two numbers or for linear scaling but does not apply in general to numerical tables where the table output may or may not be used for ratio arithmetic.

In addition to table look-up techniques, another approach to finding the reciprocal of a number has been by trial and error consisting of subtracting, underflow, restore and shift in a repetitive sequence, but such approaches are extremely slow. In the patent of H. Sierra, U.S. Pat. No. 3,648,038, another technique for obtaining the reciprocal of a number is described using a flow-through technique employing combination logic and carry-save-adder trees, all of which requires considerable hardware.

SUMMARY OF THE INVENTION

The disclosed invention comprises two embodiments of vernier addressing apparatus for performing linear or non-linear math operations using a minimum of memory locations in ROM look-up tables.

One embodiment of the disclosed invention comprises register means for storing a first input data word comprising a plurality of vernier address scales for reducing memory storage requirements, ROM means responsive to the vernier address scales for storing numerical values with increased accuracy for math processing wherein the quantization of the numerical values is determined by the bit length of a digital word stored in the ROM means, and decoding means in cooperation with the vernier address scales for selecting one of the numerical values in the ROM means. The vernier address scales comprise a plurality of vernier address positions along the input data word with each of the positions comprising a plurality of bits. The ROM means comprises a plurality of ROMs each responsive to a vernier address scale including a most significant postion ROM and a least significant position ROM. The numerical values stored in the ROM means comprise a reciprocal of a ROM address of each storage location plus one-half a quantization level for increasing the accuracy of said numerical values, said reciprocal being multiplied by a constant having any value including one which results in a true reciprocal for a numerical value.

Another embodiment of the disclosed invention comprises a first multiplier means for obtaining the square of a first input data word, a second multiplier means for obtaining the square of a second input data word, means for adding together the outputs from the first and second multipliers, register means for storing the output from the adder means, said output comprising a plurality of vernier address scales for reducing memory storage requirements, ROM means responsive to the vernier address scales for storing numerical values with increased accuracy for math processing, the quantization of the numerical values being determined by the bit length of a digital word stored in the ROM means, decoding means in cooperation with the vernier address scales for selecting one of the numerical values in the ROM means, and said numerical values comprise a square root of a sum of summed squared values plus one-half a quantization level for increasing the accuracy of the numerical values. The vernier address scales comprise a plurality of vernier address positions along the adder output with the output stored in the register means. The ROM means comprises a plurality of ROMS each responsive to a vernier address scale including a most significant position ROM, an intermediate position ROM and a least significant position ROM.

The invention further discloses the method of performing math processing using ROM look-up tables comprising the steps of storing in a register means a first input data word comprising a plurality of vernier address scales for reducing memory storage requirements, storing numerical values for said math processing in a ROM means responsive to the vernier address scales, the quantization of said numerical values being determined by the bit length of a digital word stored in the ROM means, calculating the reciprocal numerical values for each of the ROM means storage locations plus one-half a quantization level for increasing the accuracy of said numerical values, said reciprocal being multiplied by a constant having any value including one which results in a true reciprocal, and selecting one of said numerical values in said ROM means be decoding means in cooperation with said vernier address scales.

The invention further discloses the method of determining the magnitude of a square root of a sum of squared values comprising the steps of squaring a first input data word using a first multiplier means, squaring a second input data word using a second multiplier means, adding together the outputs from the first multiplier means and the second multiplier means in an adder means, storing the output from the adder means in a register means, said output comprising a plurality of vernier address scales for reducing memory storage requirements, storing numerical values for determining the magnitude in a ROM means responsive to said vernier address scales, the quantization of said numerical values being determined by the bit length of a digital word stored in said ROM means, calculating a numerical value for each of said ROM means storage locations by taking a square root of a sum of summed squared values plus one-half a quantization level for increasing the accuracy of said numerical value, and selecting one of said numerical values in said ROM means by decoding means in cooperation with the vernier address scales.

BRIEF DESCRIPTION OF THE DRAWINGS

Other and further features and advantages of the invention will become apparent in connection with the accompanying drawings wherein.

DESCRIPTION OF THE PREFERRED EMBODIMENT

Figure 1:
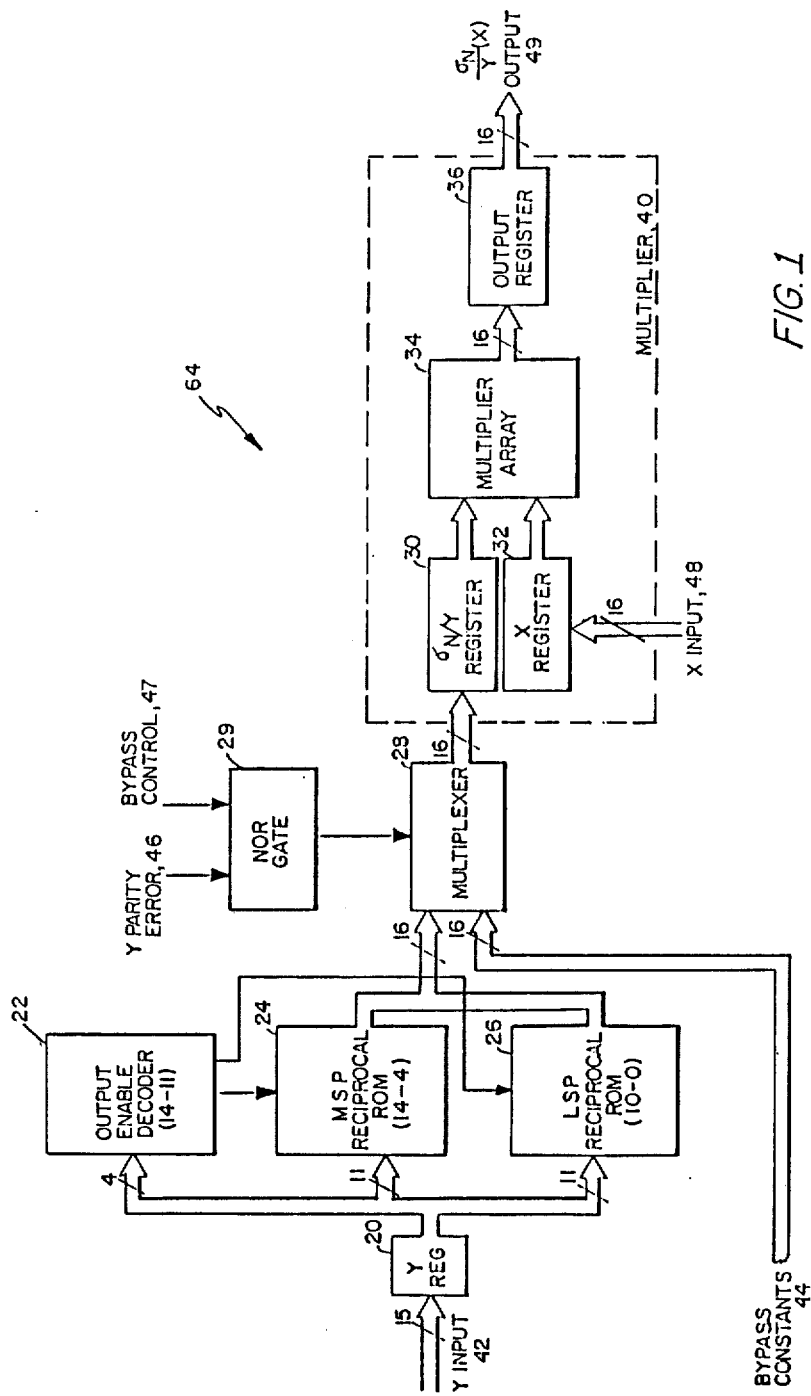
FIG. 1 is a block diagram of the reciprocal scaling apparatus embodiment according to the invention.

Referring to FIG. 1, there is shown a block diagram of a reciprocal scaling apparatus employing vernier addressing according to the present invention. The reciprocal scaling apparatus may be used in a digital signal processor for false alarm control. A 15 bit binary word (14–0) representing a Y input 42 is loaded into Y register 20. The four most significant bits (14–11) of the Y register 20 output connect to the output enable decoder 22 which determines when data is to be obtained from the most significant position (MSP) reciprocal ROM 24 instead of the least significant position (LSP) reciprocal ROM 26. The 11 most significant bits (14–4) at the output of Y register 20 address the MSP reciprocal ROM 24 and the 11 least significant bits (10–0) address the LSP reciprocal ROM 26. The data stored in these ROMs is $\sigma_N/Y$ where $\sigma_N$ is an RMS noise level constant. The function $\sigma_N/Y$ is shown assuming infinite precision. To improve the accuracy due to a finite length register quantization, the actual data stored in a ROM uses a method of a one-half level quantization step for rounding. The actual data stored in a ROM is $\sigma_N/(Y + \frac{1}{2}\ \text{Level})$. The true reciprocal of each ROM Y address occurs when $\sigma_N = 1$ or $1/Y$. The 16 bit output from each of ROMs 24 and 26 connect to one input of multiplexer 28. A second input to multiplexer 28 receives a 16 bit bypass constant for certain conditions in radar applications. A typical bypass constant is $Y = \sigma_N$. Multiplexer 28 normally selects the output from ROMs 24 and 26 unless a Y parity error 46 signal occurs or a bypass control 47 signal occurs at the input to NOR gate 29. The output of NOR gate 29 is connected to multiplexer 28 and causes the multiplexer to select the bypass constant 44 inputs.

The 16 bit output of multiplexer 28 connects to multiplier 40. Multiplier 40 comprises a $\sigma_N/Y$ register 30 which receives and stores the $\sigma_N/Y$ output from multiplexer 28, an X register 32 which receives and stores a 16 bit X input 48, a multiplier array 34 which performs the multiplication of $(\sigma_N/Y)\cdot(X)$ and an output register 36 for storing the product of said multiplication represented by $(\sigma_N/Y)\cdot X$ output 49.

The multiplier 40 may be embodied by using an MPY-16HJ LSI multiplier manufactured by TRW which includes a $\sigma_N/Y$ register 30, an X register 32 and output register 36 in addition to the multiplier array 34. The output enable decoder may be embodied with an LS20 NAND gate and an LS240 inverter integrated circuits. The MSP reciprocal ROM 24 and the LSP reciprocal ROM 26 may be embodied each with a pair of 2716 programmable read-only memories manufactured by INTEL which together provide a 16 most significant bit output; each 2716 ROM comprises 16,384 bits organized as 2048 words by 8 bits per word. The multiplexer 28 may be embodied with LS157 data selector/multiplexer integrated circuits.

Figure 2:
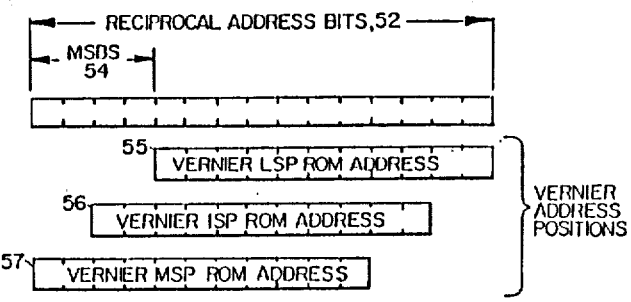
FIG. 2 shows three vernier address position scales of ROM addresses for selecting different ROMs.
Figure 3:
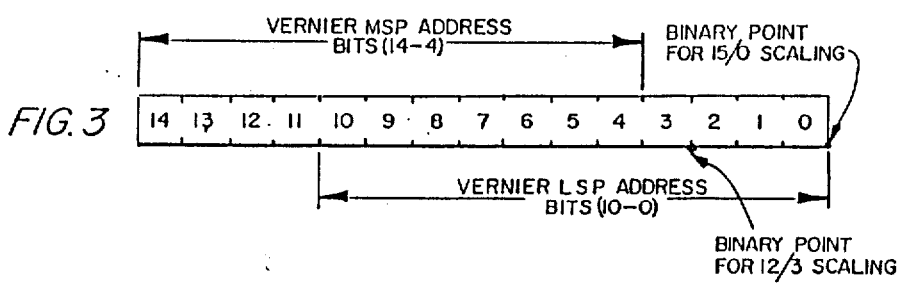
FIG. 3 shows a 15 bit input word to the Y register of the reciprocal scaling apparatus with the binary point placed for 12/3 scaling or for 15/0 scaling; an MSP and an LSP vernier address position scales are also shown.

Referring now to FIG. 2, a vernier address scale is shown with three positions comprising a vernier least significant position (LSP) ROM address 55, a vernier intermediate significant position (ISP) ROM address 56, and a vernier most significant position (MSP) ROM address 57. The four most significant bits (MSBS) 54 of the reciprocal address bits 52 are decoded to enable a desired ROM, and the bits within the vernier address position directly address a location within the ROM. FIG. 3 shows the two vernier address scales used for the reciprocal scaling embodiment of FIG. 1. The least significant position ROM address comprises bits 10 thru 0 and the most significant position ROM address comprises bits 14 thru 4. The binary point is assumed to be placed between bit positions 3 and 2 for 12/3 scaling or after bit position 0 for 15/0 scaling.

A vernier address scale provides a means for reducing the number of required addressable memory locations of numerical look-up tables. This approach does not restrict the accuracy of linear and non-linear functions using the data from the look-up tables. The accuracy required determines the scaling and quantization level or the number of output bits in a ROM look-up table. This constraint determines the scaling and quantization levels of the input data used to address the ROM table and the number of least significant input bits that can be dropped in going from one ROM table to another as the word size increases. The size of the numerical tables for reciprocals, powers of numbers, roots of numbers, logarithms, trigonometric and exponential functions can be reduced using a vernier address scale without a loss of accuracy.

In a typical radar application, the received signal is match filtered and envelope detected. Constant false alarm rate signal processing estimates the average interference level Y and normalizes the next input X before detection. The normalization and detection process is:

$$\frac{\sigma_N}{Y} \cdot X \geq T$$

where:

$\sigma_N$ = RMS noise level set by the radar receiver.
Y = average number of interference levels.
X = number of received signal levels.
T = ALARM THRESHOLD.

Figure 4A:
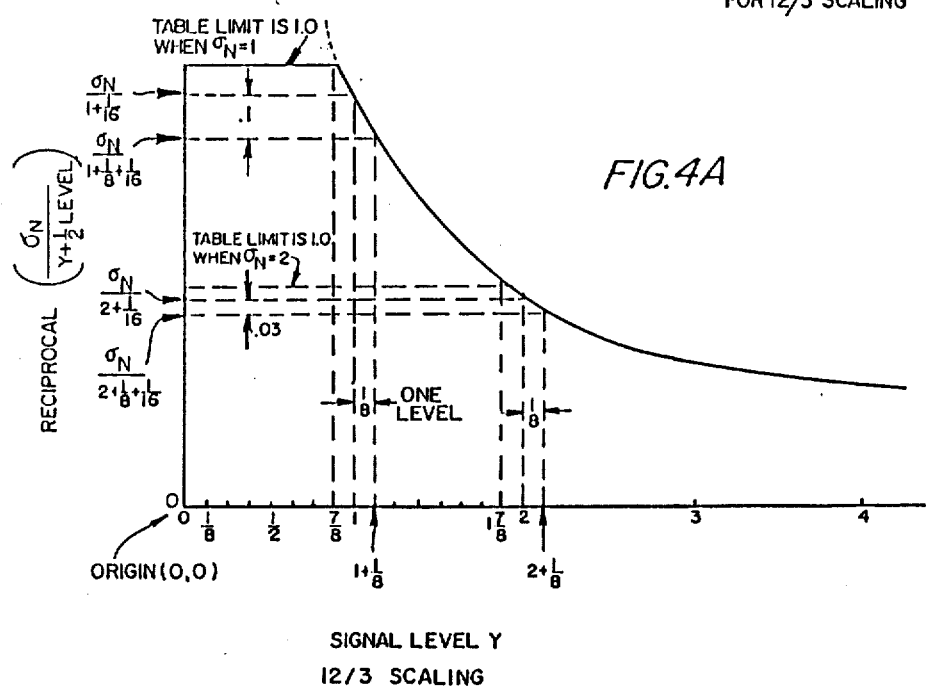
FIG. 4A is a graph of the reciprocal of a number Y multiplied by $\sigma_N$ vs. the number Y for 12/3 scaling showing the error compression that occurs for reciprocal numbers.
Figure 4B:
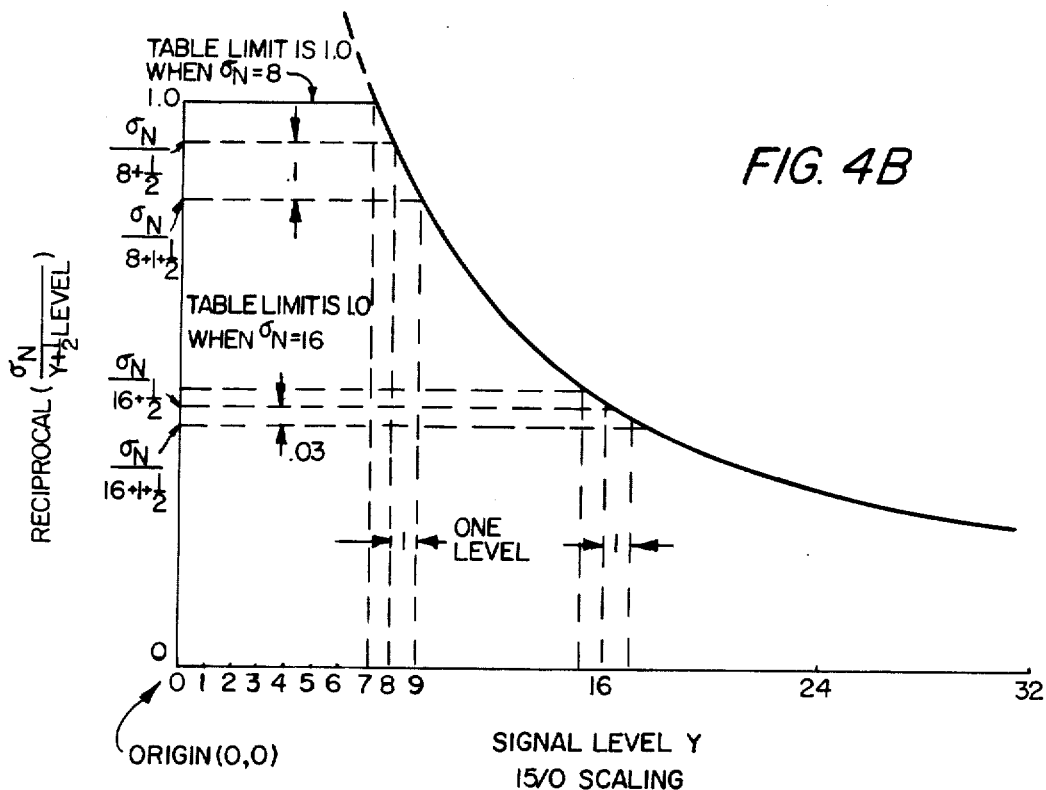
FIG. 4B is a graph of the reciprocal of a number Y multiplied by $\sigma_N$ vs. the number Y for 15/0 scaling showing the error compression that occurs for reciprocal numbers.

The scaled output shown in FIG. 1 is the product of the present input X times the reciprocal $\sigma_N/Y$. The input number Y is single precision and the reciprocal $\sigma_N/Y$ is double precision with a quotient and a remainder. When the reciprocal is used to normalize the received signal level to the radar receiver noise level ($\sigma_N$) and the result is greater than one, a one is stored in the PROM table to pass the signal with unity gain, as shown in FIGS. 4A and 4B. The advantage of a vernier address scale is the ability to continue or charge the function at any input level Y.

The radar application requires 3 extra bits for the interference estimator time constants of $\frac{1}{2}$, $\frac{1}{4}$ and $\frac{1}{8}$. The input (X) to be scaled is 12 bits left justified with the three LSB's zero filled. When the input X is 10 bit data, the two MSB's are zero filled to use the same ROMs for 10 or 12 bit data. The normalized output is scaled 12/3 or 15/0 to avoid quantization losses due to the estimator.

Referring now to FIGS. 4A and 4B, FIG. 4A is a graph of the reciprocal of a number Y multiplied by $\sigma_N$ vs. the number Y for 12/3 scaling showing the error compression that occurs for reciprocal number due to equal increments of the number Y not having equal increments on the reciprocal axis; reciprocal numbers are compressed as the number Y gets larger. FIG. 4B is a similaar graph for signal level Y with 15/0 scaling. Regardless of the scaling used in the binary number system, the number stored in a ROM address has the same numerical value. For example, assume a binary number Y for the LSP reciprocal ROM 26 as follows:

stant $\sigma_N$. Also shown in said tables are the 11 bit address scale for the 2048 words stored in each ROM and the one-half level for 15/0 and 12/3 Y scaling used to improve the accuracy of the numbers stored in said ROMs.

Figure 5:
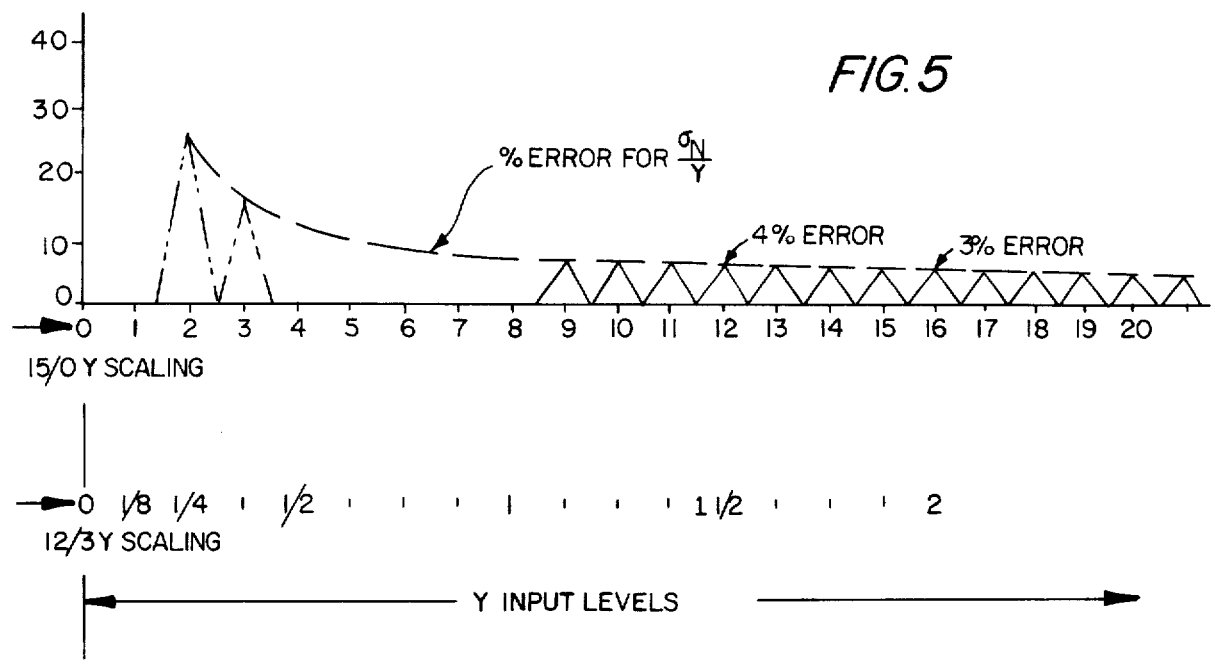
FIG. 5 is a graph showing percentage of error for $\sigma_N/Y$ with two different Y input levels.

Equal increments of the signal level Y shown for one level as shown in FIGS. 4A and 4B do not have equal percent errors for the transformed signal on the reciprocal axis. This is true for all functions even a straight line thru the origin. The small numbers, fractions or integers have the larger percent errors. The maximum errors are set by small numbers, where the error signal varies as a function of signal level Y. The effective error gain is greater for smaller than for larger signals. The error compression is such that with 2K × 8 PROMS, only two are required to hold the error between PROMS at less than 0.4 percent. The error characteristics for small numbers is shown in FIG. 5. When the noise is at 2 input level scaled 12/3 or at 16 input level scaled 15/0 the 3 extra bits for quantization reduce the maximum error to 3 percent. Adding the three additional bits for estimator quantization has reduced the percentage error by 6 db per bit. The advantage in this architecture is that maximum errors are set by the word size and number of bits retained for the scaled output. The two scales in FIG. 5, 12/3 and 15/0, show the techniques for reducing quantization errors are to increase the system noise level or increase the number of bits for quantization (three in this case).

If $\sigma_N$ equals a one, the output table is a true reciprocal table. The advantage of vernier address scaling is that this technique can be applied to any input word length and the output function can be true or adaptive depending on the input level used to address the ROMs.

The input signal or address to a ROM has only a finite number of quantization levels. The smallest step is one level or one quantization step Q. When an extra bit is not available for rounding, the error signal is equal to or less than Q. When the transformed output uses the input signal level plus one-half the smallest level or one-half a quantization step Q/2, as shown in FIGS. 4A, 4B and 5, the error signal has been reduced by 50 percent and this increases the accuracy of the numerical values stored in the ROMs. The error is equal to or less than Q/2, equal to a greater than $-Q/2$. This method transforms the error function from probability density function for truncation $P_t(e)$ to probability density function for

| Y           | 1  | 0  | 0 | 0   | 0   | 0   |      |
|-------------|----|----|---|-----|-----|-----|------|
| 12/3 scaling | 4  | 2  | 1 | 1/2 | 1/4 | 1/8 | 1/16 |
| 15/0 scaling | 32 | 16 | 8 | 4   | 2   | 1   | 1/2  |

↑ $\sigma_N$    ↑ LSP 1/2 Level

For 12/3 scaling, $\sigma_N = 2$ and $$\frac{\sigma_N}{Y + 1/2 \text{ level}} = \frac{2}{4 + 1/16} = 0.492307692 = (0.011111100000010)$$

↙ Binary number for reciprocal ROM table

For 15/0 scaling, $\sigma_N = 16$ and $$\frac{\sigma_N}{Y + 1/2 \text{ level}} = \frac{16}{32 + 0.5} = 0.492307692 = (0.011111100000010)$$

Figure 8A:
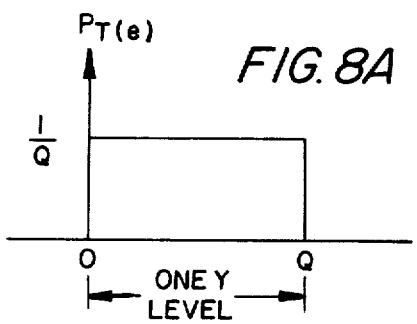
FIG. 8A shows the probability density function of ROM table error for one Y level.
Figure 9A:
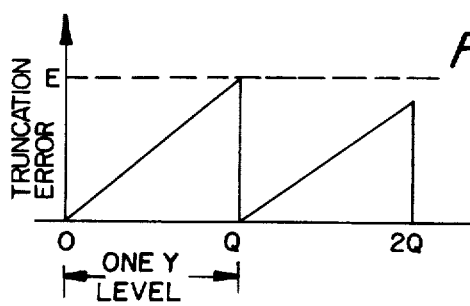
FIG. 9A shows the truncation error for a finite number of quantization levels stored in a ROM table.
Figure 8B:
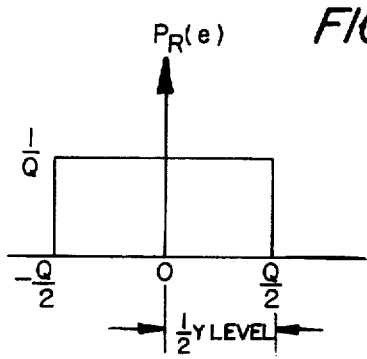
FIG. 8B shows the probability density function of ROM table error for one-half Y level.
Figure 9B:
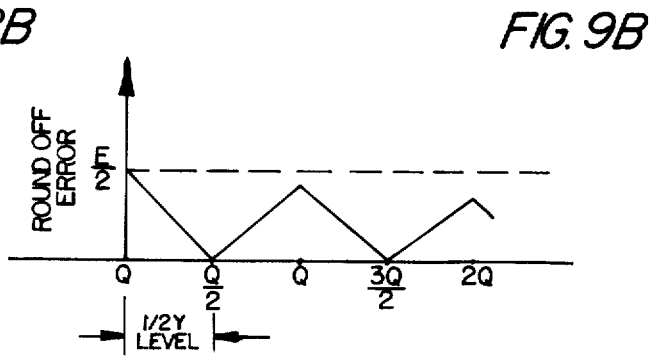
FIG. 9B shows the round-off error for a finite number of quantization levels stored in a ROM table.

Tables 1 and 2 show the rest of the numbers stored in the MSP reciprocal ROM 24 and the LSP reciprocal ROM 26 for reciprocal numbers multiplied by the conrounding $P_r(e)$ as shown in FIGS. 8A and 8B. As shown in FIGS. 5, 9A and 9B, the one-half level method of storing numbers rounded rather than truncated in ROMs reduces the error by 50 percent. FIG. 9A shows that as the number of quantization levels increase, the truncation error gets smaller and FIG. 9B shows that roundoff error is 50 percent smaller than truncation error of FIG. 9A and it decreases as the number of quantization levels increase.

Figure 7:
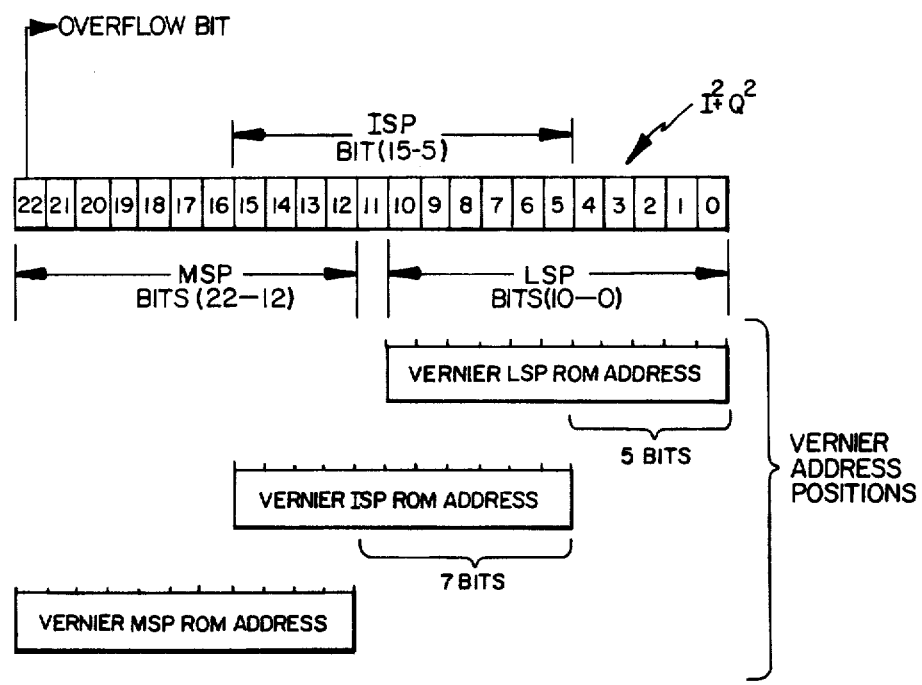
FIG. 7 shows three vernier address position scales for the ROMs of the alternate embodiment as shown in FIG. 6.
Figure 6:
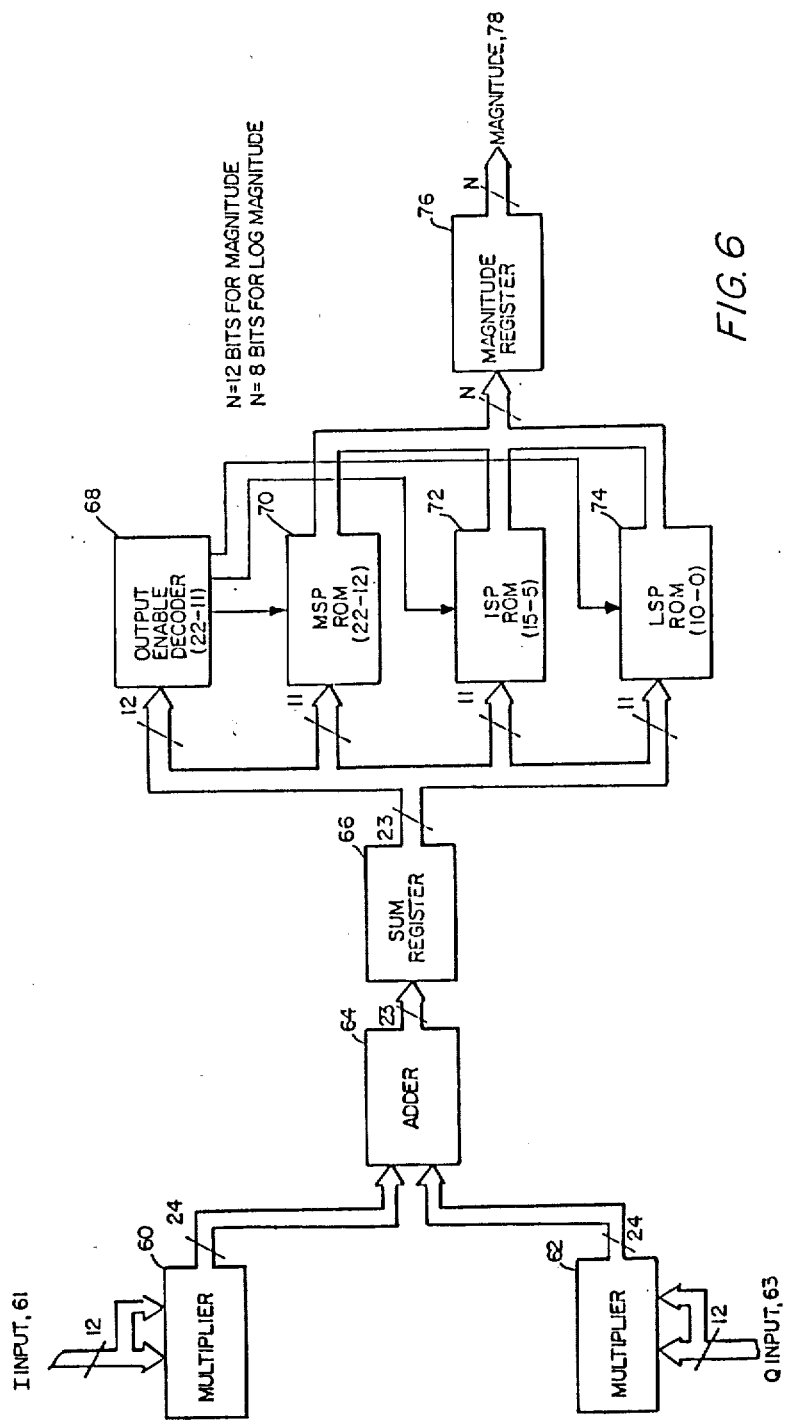
FIG. 6 is a block diagram of an alternate embodiment according to the invention for determining the magnitude of the square root of the sum of two squared numbers.

Referring now to FIG. 6, there is shown a block diagram of an alternate embodiment comprising vernier addressing apparatus. This embodiment is a digital envelope detector. An envelope detector determines the magnitude of a complex number and takes advantage of accuracy improvement due to error compression as numbers get larger and accuracy is further improved by using a method of one-half level quantization step for rounding as shown in FIGS. 9A and 9B. Maximum error is determined by the number of bits retained for the output magnitude and not by approximations used to generate the magnitude. The accuracy required determines the number of output bits and this constraint determines the number of least significant bits that can be dropped in going from one ROM table to the next one as the word size increases. I input 61 is provided to multiplier 60 and Q input 63 is provided to multiplier 62. Both multipliers are 12×12 bit multipliers and form the square of each respective input I and Q. The output $I^2$ of multiplier 60 connects to one input of adder 64 and the output $Q^2$ of multiplier 62 connects to the other input of adder 64. Adder 64 produces a maximum sum $I^2+Q^2$ of 23 bits; the 23rd bit of the sum $I^2+Q^2$ is used to indicate overflow and to address the most significant position (MSP) ROM 70 for generating a maximum magnitude when overflow occurs. Coherent signal processing in a radar application constrains the maximum magnitude to be equal to the maximum value of the magnitude of the I or Q component. The 23 bit output from adder 64 is stored in sum register 66. The 23 bit output of sum register 66 provides the three vernier scale addresses for the MSP ROM 70, ISP ROM 72 and LSP ROM 74. As shown in FIG. 7, the vernier ISP ROM address eliminates the first five bits of the sum register 66 output and the vernier MSP ROM address eliminates an additional seven bits. The smaller numbers represented by the vernier LSP ROM addresses are the ones that determine the maximum error and permit the dropping of more and more least significant bits as the vernier address scale moves to higher address ROMs. The 23 bit output of sum register 66 is connected to said ROMs 70, 72 and 74 as shown in FIG. 7. Bits 10–0 are connected to the 11 bit address inputs of the LSP ROM 74; bits 15-5 are connected to the 11 bit address inputs of the ISP ROM 72; and bits 22–12 are connected to the 11 bit address input of the MSP ROM 70. Tables 3, 4, and 5 are the magnitude numbers stored in the MSP ROM 70, ISP ROM 72 and LSP ROM 74. Also shown in the tables is the 11 bit address scale for the 2048 words stored in each ROM and the one-half level for Y used to improve the accuracy of the numbers stored in said ROMS. The 12 most significant bits (22 thru 11) of the sum register 66 output are decoded to determine which ROM to enable for the magnitude output. The LSP ROM 74 is selected when bits 22 thru 11 are all logic zeros; the ISP ROM 72 is selected when the highest bit set to a logic one is between bits 15 and 11; and the MSP ROM 70 is selected when the highest bit set to a logic one is between bits 22 and 16. The output of MSP ROM 70, ISP ROM 72 or LSP ROM 74 is connected to a magnitude register 76 which stores the magnitude output.

Referring again to FIG. 6, multipliers 60 and 62 may be embodied by using an MPY-12HJ LSI multiplier manufactured by TRW. Adder 64 may be embodied with LS381 and LS182 integrated circuits. The sum register 66 may be embodied with LS374 integrated circuits and the output enable decoder 68 may be embodied with LS260, LS02 and LS00 integrated circuits. The MSP ROM 70, ISP ROM 72, and LSP ROM 74 may be embodied with 2716 programmable read-only memories manufactured by INTEL; each 2716 ROM comprises 16,384 bits organized as 2048 words×8 bits per word.

This concludes the description of the embodiment of the invention described herein. However, many modifications and alterations will be obvious to one of ordinary skill in the art without departing from the spirit and scope of the inventive concept. For example, with respect to the reciprocal scaling embodiment, the length of the Y register may be varied to handle Y input 42 data of 12, 15, 20 or 24 bits wide. With respect to the embodiment for determining the magnitude of a complex number, the I input 61 and Q input 63 data may be 12, 16, 20 or 24 bits wide with a corresponding variation in the bit length of the multiplier. Both embodiments may use any size ROM organized by M words by N bits depending on the application. The ROM selected for a radar application was 2048 words by 8 bits. Therefore, it is intended that the scope of this invention be limitd only by the appended claims.

TABLE 1

| | | LSP RECIPROCAL ROM TABLE | | |
|---|---|---|---|---|
| LSP ROM ADDRESS | Y* 15/0 Scaling $\sigma_N = 16$ 1/2 Level = 1/2 | Y* 12/3 Scaling $\sigma_N = 2$ 1/2 Level = 1/16 | MSP ROM DATA $\sigma_N$ Y + 1/2 Level | Comments |
| 0 | 0 | 0 | 1.0 | Quantize decimal numbers to output |
| 1 | 1 | 1/8 | 1.0 | accuracy required and store binary |
| 2 | 2 | 2/8 | 1.0 | numbers in ROM Table. |
| . | . | . | . | Table Output = 1.0 for Y < $\sigma_N$ |
| 15 | 15 | 1 7/8 | 1.0 | |
| 16 | 16 | 2 | .969696965 | |
| 17 | 17 | 2 1/8 | .914285714 | Table Output for Y ≧ $\sigma_N$ |
| . | . | . | . | |
| 32 | 32 | 4 | .492307692 | |
| . | . | . | . | 0.011111100000010 |

TABLE 1-continued

LSP RECIPROCAL ROM TABLE

| LSP ROM ADDRESS | Y* 15/0 Scaling $\sigma_N = 16$ 1/2 Level = 1/2 | Y* 12/3 Scaling $\sigma_N = 2$ 1/2 Level = 1/16 | MSP ROM DATA $\frac{\sigma_N}{Y + 1/2\ Level}$ | Comments |
|---|---|---|---|---|
| . | . | . | . | Binary point for 1/15 ROM Table Scaling for LSP ROM Address 32 |
| 2046 | 2046 | 255 6/8 | .007818226 | |
| 2047 | 2047 | 255 7/8 | .007814407 | |

|  | LSP ADDRESS |  |  |  |  |  |  |  |  |  |  |  |  |
|---|---|---|---|---|---|---|---|---|---|---|---|---|---|
| Bit Weights | | | | 1024 | 512 | 256 | 128 | 64 | 32 | 16 | 8 | 4 | 2 | 1 | | | LSP Address Scale |
| | | | | 1024 | 512 | 256 | 128 | 64 | 32 | 16 | 8 | 4 | 4 | 1 | 1/2 | | 15/0 Y Scale |
| | | | | 128 | 64 | 32 | 16 | 8 | 4 | 2 | 1 | 1/2 | 1/4 | 1/8 | 1/16 | | 12/3 Y Scale |
| | 14 | 13 | 12 | 11 | 10 | 9 | 8 | 7 | 6 | 5 | 4 | 3 | 2 | 1 | 0 | −1 | Bit Number |

LSB → LSP 1/2 Level
$\sigma_N$

*Y = Address × weight of Y LSB

TABLE 2

MSP RECIPROCAL ROM TABLE

| MSP ROM ADDRESS | Y* 15/−4 Scaling $\sigma_N = 16$ ¼ Level = 8 | Y* 12/1 Scaling $\sigma_N = 2$ ¼ Level = 1 | LSP ROM DATA $\frac{\sigma_N}{Y + ¼\ Level}$ | Comments |
|---|---|---|---|---|
| 0 | } not used | | | |
| . | | | | |
| 127 | | | | |
| 128 | 2048 | 256 | .007782101 | |
| 129 | 2064 | 258 | .007722007 | |
| 130 | 2080 | 260 | .007662835 | Table Output for Y > $\sigma_N$ |
| . | . | . | . | |
| 144 | 2304 | 288 | .006920415 | |
| . | . | . | . | |
| 1985 | 31760 | 3970 | .000503651 | |
| 1986 | 31776 | 3972 | .000503397 | |
| . | . | . | . | |
| 2046 | 32736 | 4092 | .000488639 | |
| 2047 | 32752 | 4094 | .000488400 | |

|  | MSP ADDRESS |  |  |  |  |  |  |  |  |  |  |  |  |  |  |
|---|---|---|---|---|---|---|---|---|---|---|---|---|---|---|---|
| Bit Weights | 1024 | 512 | 256 | 128 | 64 | 32 | 16 | 8 | 4 | 2 | 1 | | | | | MSP Address Scale |
| | 16384 | 8192 | 4096 | 2048 | 1024 | 512 | 256 | 128 | 64 | 32 | 16 | 8 | | | | 15/0 Y Scale |
| | 2048 | 1024 | 512 | 256 | 128 | 64 | 32 | 16 | 8 | 4 | 2 | 1 | | | | 12/3 Y Scale |
| | 14 | 13 | 12 | 11 | 10 | 9 | 8 | 7 | 6 | 5 | 4 | 3 | 2 | 1 | 0 | Bit Number |

$\sigma_N$ MSP ¼ Level
LSB

*Y = Address × Weight of Y LSB

TABLE 3

LSP ROM

| LSP ROM Address | $(I^2 + Q^2)$* | Magnitude Data $\sqrt{(I^2 + Q^2)}$ + ½ Level | Log Data $(20\ Log_{10}\sqrt{I^2 + Q^2})$ + ½ Level | Comments |
|---|---|---|---|---|
| 0 | 0 | 0 | −∞ | Quantize decimal numbers to |
| 1 | 1 | 1.224745 | 1.7609 | output accuracy required |
| 2 | 2 | 1.581139 | 3.9794 | and store binary numbers in |
| . | . | . | | ROM Table. |

TABLE 3-continued

LSP ROM

| LSP ROM Address | $(I^2 + Q^2)$* | Magnitude Data $\sqrt{(I^2 + Q^2)} + \frac{1}{2}$ Level | Log Data $(20 \log_{10} \sqrt{I^2 + Q^2}) + \frac{1}{2}$ Level | Comments |
|---|---|---|---|---|
| . | . | . | . | Table output for magnitude or LOG magnitude |
| 8 | 8 | 2.915476 | 9.2942 | |
| . | . | . | . | |
| 2047 | 2047 | 45.249309 | 33.1122 | |

Bit Weight:

| 1024 | 512 | 256 | 128 | 64 | 32 | 16 | 8 | 4 | 2 | 1 | ½ | LSP Address Scale = $I^2 + Q^2$ Scale |
|---|---|---|---|---|---|---|---|---|---|---|---|---|
| 10 | 9 | 8 | 7 | 6 | 5 | 4 | 3 | 2 | 1 | 0 | −1 | Bit Number |

LSP ADDRESS (bits 10 to 0), LSB*, LSP ½ Level

*$I^2 + Q^2$ = Address × weight of the LSB

TABLE 4

ISP ROM

| ISP ROM Address | $(I^2 + Q^2)$* | Magnitude Data $(I^2 + Q^2) + \frac{1}{2}$ Level | Log Data $(20 \log_{10} \sqrt{I^2 + Q^2}) + \frac{1}{2}$ Level | Comments |
|---|---|---|---|---|
| 0 . . . 63 | not used | | | Quantize decimal numbers to output accuracy required and store binary numbers in ROM Table. |
| 64 | 2048 | 45.43127 | 33.1471 | |
| 65 | 2080 | 45.78209 | 33.2139 | Table output for magnitude or LOG magnitude. |
| . | . | . | . | |
| 2047 | 65504 | 255.96875 | 48.1637 | |

ISP ADDRESS:

| 1026 | 512 | 256 | 128 | 64 | 32 | 16 | 8 | 4 | 2 | 1 | |
|---|---|---|---|---|---|---|---|---|---|---|---|
| $2^{15}$ | $2^{14}$ | 8192 | 4096 | 2048 | 1024 | 512 | 256 | 128 | 64 | 32 | 16 | $I^2 + Q^2$ Scale |
| 15 | 14 | 13 | 12 | 11 | 10 | 9 | 8 | 7 | 6 | 5 | 4 | Bit Number |

ISP ½ Level

LSB × $I^2 + Q^2$ = Address × weight of the $I^2 + Q^2$ LSB

TABLE 5

MSP ROM

| MSP ROM Address | Address × Wgt. of LSB $(I^2 + Q^2)$ | Magnitude Data $\sqrt{(I^2 + Q^2)} + \frac{1}{2}$ Level | Log Data $(20 \log_{10} \sqrt{I^2 + Q^2}) + \frac{1}{2}$ Level | Comments |
|---|---|---|---|---|
| 0 . . . 15 | not used | | | Quantize decimal numbers to output accuracy required and store binary numbers in ROM Table. |

TABLE 5-continued

MSP ROM

| MSP ROM Address | Address × Wgt. of LSB ($I^2 + Q^2$) | Magnitude Data $\sqrt{(I^2 + Q^2)} + \frac{1}{2}$ Level | Log Data $(20 \log_{10} \sqrt{I^2 + Q^2}) + \frac{1}{2}$ Level | Comments |
|---|---|---|---|---|
| 16 | 65536 | 259.96923 | 48.2984 | |
| 17 | 69632 | 267.73120 | 48.5540 | |
| . | . | . | . | Table output for magnitude or LOG magnitude. |
| . | . | . | . | |
| . | . | . | . | |
| 1022 | 4186112 | 2046.49945 | 66.2202 | |
| 1023 | 4190208 | 2047 | 66.2223 | |
| 1024 | | 2047 | 66.2223 | |
| . | Overflow Bit 22 = 1 | . | . | |
| 2047 | | 2047 | 66.2223 | |

| | MSP ADDRESS | | | | | | | | | | | | |
|---|---|---|---|---|---|---|---|---|---|---|---|---|---|
| Bit | 1024 | 512 | 256 | 128 | 64 | 32 | 16 | 8 | 4 | 2 | 1 | | MSP Address Scale |
| Weight | $2^{22}$ | $2^{21}$ | $2^{20}$ | $2^{19}$ | $2^{18}$ | $2^{17}$ | $2^{16}$ | $2^{15}$ | $2^{14}$ | 8192 | 4096 | 2048 | $I^2 + Q^2$ Scale |
| | 22 | 21 | 20 | 19 | 18 | 17 | 16 | 15 | 14 | 13 | 12 | 11 | Bit Number |

Overflow IF Bit = 1

½ Level MSP ROM

LSB

What is claimed is:

1. In combination:
   register means for storing a first input data word comprising a plurality of vernier address scales for reducing memory storage requirements;
   ROM means for storing numerical values with increased accuracy, the quantization of said numerical values being determined by the bit length of a digital word stored in said ROM means, said ROM means having a first portion coupled to a first portion of said plurality of vernier address scales and a second different portion coupled to a second portion of said plurality of vernier address scales; and
   ROM decoding means for selecting an output from a portion of said ROM means, said portion being addressed by one of said vernier address scales.

2. The combination as recited in claim 1 wherein:
   said vernier address scales comprise a plurality of vernier address positions along said input data word, each of said positions comprising a plurality of bits.

3. The combination as recited in claim 1 wherein:
   said numerical values stored in said ROM means comprise reciprocal values of a plurality of numbers multiplied by a constant, said constant being any number including one which results in a true reciprocal value.

4. The combination as recited in claim 3 wherein:
   said constant may be determined by an RMS noise level set in a radar receiver.

5. The combination as recited in claim 1 wherein:
   said ROM means responsive to said first portion of said vernier address scales comprises a most significant position ROM.

6. The combination as recited in claim 1 wherein:
   said ROM means responsive to said second portion of said vernier address scales comprises a least significant position ROM.

7. In combination:
   register means for storing a first input data word comprising a plurality of vernier address scales for reducing memory storage requirements;
   ROM means responsive to said vernier address scales for storing numerical values with increased accuracy for math processing, the quantization of said numerical values being determined by the bit length of a digital word stored in said ROM means;
   decoding means for selecting a portion of said ROM means, said portion being addressed by one of said vernier address scales for selecting one of said numerical values in said ROM means;
   multiplexer means for selecting a data word from said ROM means or from a second input data word source; and
   multiplier means for multiplying a data word from said multiplexer means by a third input data word.

8. The combination as recited in claim 7 wherein:
   said vernier address scales comprise a plurality of vernier address positions along said input data word, each of said positions comprising a plurality of bits.

9. The combination as recited in claim 7 wherein:
   said numerical values stored in said ROM means comprise reciprocal values of a plurality of numbers multiplied by a constant, said constant being any number including one which results in a true reciprocal value.

10. The combination as recited in claim 9 wherein:
    said constant may be determined by an RMS noise level set in a radar receiver.

11. The combination as recited in claim 7 wherein:

said ROM means responsive to said vernier address scales comprises a most significant position ROM.

12. The combination as recited in claim 7 wherein:
said ROM means responsive to said vernier address scales comprises a least significant position ROM.

13. The combination as recited in claim 7 wherein:
said multiplexer means comprises control means for selecting a bypass constant.

14. The combination as recited in claim 7 wherein:
said multiplier means performs a scaling function on said third input data word.

15. The combination as recited in claim 7 wherein:
said multiplier means comprises a plurality of storage registers and a multiplier array for performing said scaling function on said third input data word.

16. In combination:
register means for storing a first input data word comprising a plurality of vernier address scales for reducing memory storage requirements;
ROM means for storing numerical values, the quantization of said numerical values being determined by the bit length of a digital word stored in said ROM means, said ROM means having a first portion coupled to a first portion of said plurality of vernier address scales and a second different portion coupled to a second portion of said plurality of vernier address scales;
said numerical values comprising a reciprocal of a sum of a ROM address of each storage location plus one-half a quantization level for increasing the accuracy of said numerical values, said reciprocal being multiplied by a constant having any value including one which results in a true reciprocal;
ROM decoding means for selecting an output from a portion of said ROM means, said portion being addressed by one of said vernier address scales.

17. The combination as recited in claim 16 wherein:
said vernier address scales comprise a plurality of vernier address positions along said input data word, each of said positions comprising a plurality of bits.

18. The combination as recited in claim 16 wherein:
said ROM means responsive to said first portion of said vernier address scales comprises a most significant position ROM.

19. The combination as recited in claim 16 wherein:
said ROM means responsive to said second portion of said vernier address scales comprises a least significant position ROM.

20. In combination:
register means for storing a first input data word comprising a plurality of vernier address scales for reducing memory storage requirements;
ROM means responsive to said vernier address scales for storing numerical values for math processing, the quantization of said numerical values being determined by the bit length of a digital word stored in said ROM means;
said numerical values comprising a reciprocal of a ROM address of each storage location plus one-half a quantization level for increasing the accuracy of said numerical values, said reciprocal being multiplied by a constant having any value including one which results in a true reciprocal;
decoding means for selecting a portion of said ROM means, said portion being addressed by one of said vernier address scales for selecting one of said numerical values in said ROM means;
multiplexer means for selecting a data word from said ROM means or from a second input data word source; and
multiplier means for multiplying a data word from said multiplexer means by a third input data word.

21. The combination as recited in claim 20 wherein:
said vernier address scales comprise a plurality of vernier address positions along said input data word, each of said positions comprising a plurality of bits.

22. The combination as recited in claim 20 wherein:
said ROM means responsive to said vernier address scales comprises a most significant position ROM.

23. The combination as recited in claim 20 wherein:
said ROM means responsive to said vernier address scales comprises a least significant position ROM.

24. The combination as recited in claim 20 wherein:
said multiplexer means comprises control means for selecting a bypass constant.

25. The combination as recited in claim 20 wherein:
said multiplier means performs a scaling function on said third input data word.

26. The combination as recited in claim 20 wherein:
said multiplier means comprises a plurality of storage registers and a multiplier array for performing said scaling function on said third input data word.

27. The method of performing math processing using ROM look-up tables comprising the steps of:
storing in a register means a first input data word comprising a plurality of vernier address scales for reducing memory storage requirements;
storing numerical values for said math processing in a ROM means responsive to said vernier address scales, the quantization of said numerical values being determined by the bit length of a digital word stored in said ROM means;
calculating said numerical values for each of said ROM means storage locations by taking a reciprocal of a ROM address of each said storage location plus one-half a quantization level for increasing the accuracy of said numerical values, said reciprocal being multiplied by a constant having any value including one which results in a true reciprocal; and
selecting one of said numerical values in said ROM means by decoding means for selecting a portion of said ROM means, said portion being addressed by one of said vernier address scales.

28. The method as recited in claim 27 wherein:
said vernier address scales comprise a plurality of vernier address positions along said input data word each of said positions comprising a plurality of bits.

29. The method as recited in claim 27 wherein:
the step of storing said numerical values in a ROM means comprises a most significant position ROM.

30. The method as recited in claim 27 wherein:
the step of storing said numerical values in a ROM means comprises a least significant position ROM.

* * * * *